United States Patent [19]

Richardson et al.

[11] 3,948,337
[45] Apr. 6, 1976

[54] INDEPENDENT FRONT SUSPENSION FOR FRONT WHEEL DRIVE

[75] Inventors: John A. Richardson, Windsor, Canada; Donald G. Wheatley, Orchard Lake, Mich.

[73] Assignee: Ford Motor Company, Dearborn, Mich.

[22] Filed: Oct. 4, 1973

[21] Appl. No.: 403,599

[52] U.S. Cl............ 180/43 R; 180/73 C; 267/20 A
[51] Int. Cl................................... B60K 17/30
[58] Field of Search............ 180/43 R, 42, 44, 73 R, 180/73 C, 73 D; 280/96.2 R, 124 A; 267/20 A

[56] References Cited
UNITED STATES PATENTS

| | | | |
|---|---|---|---|
| 1,874,505 | 8/1932 | Gregoire | 180/43 R |
| 2,053,869 | 9/1936 | Haltenberger | 180/73 C |
| 2,055,975 | 9/1936 | Haltenberger | 180/73 C |
| 2,942,893 | 6/1960 | Nallinger | 180/73 D |
| 2,983,328 | 5/1961 | Ewert | 180/73 C |
| 3,385,081 | 5/1968 | Wier | 180/43 R |

Primary Examiner—M. H. Wood, Jr.
Assistant Examiner—Jack D. Rubenstein
Attorney, Agent, or Firm—Clifford L. Sadler; Keith L. Zerschling

[57] ABSTRACT

This invention relates to an independent suspension system for the front steerable wheels of a motor vehicle having front wheel drive. The suspension for one of the wheels includes a transverse suspension arm and a longitudinal radius arm that are rigidly interconnected. The suspension for the other wheel includes a pivotally mounted housing that contains both differential gearing and an axle shaft connected to the other wheel. A second radius arm is connected to the housing. The wheels are angularly displaced during jounce and rebound movement about diagonally arranged pivot axes that intersect.

6 Claims, 4 Drawing Figures

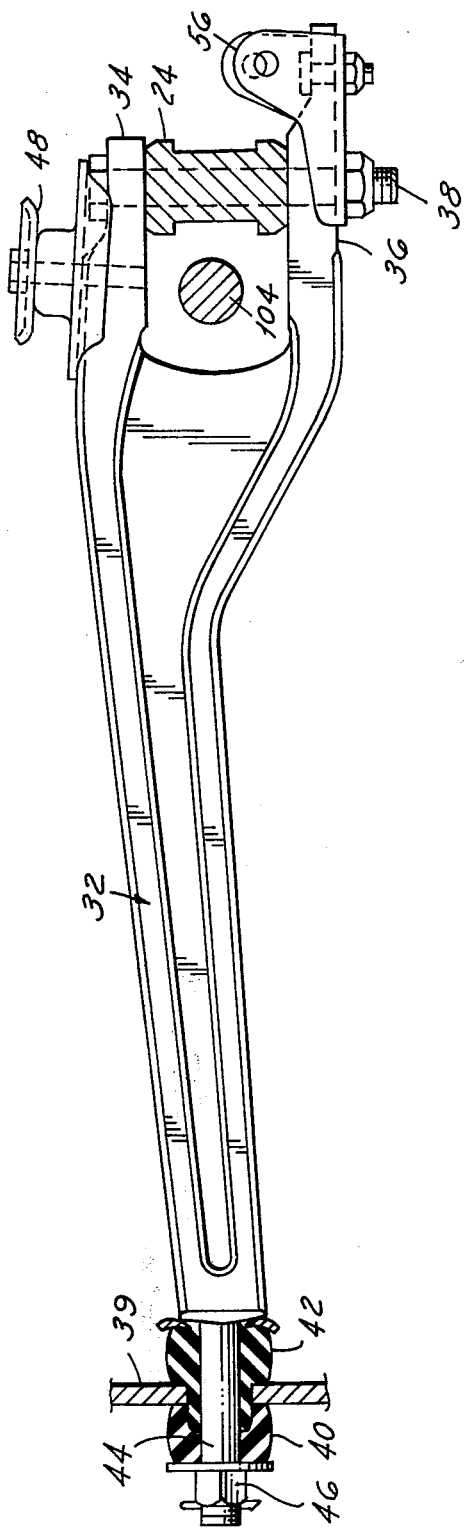

INDEPENDENT FRONT SUSPENSION FOR FRONT WHEEL DRIVE

BACKGROUND OF THE DISCLOSURE

The present invention is particularly concerned with the design of an independent front suspension for either a four wheel drive or a front wheel drive vehicle. Suspensions of this type are usually complicated and expensive to manufacture.

A suspension in accordance with the present invention has fewer components than previously known independent front suspension systems for driving wheels. The suspension is characterized by its simplicity of construction and its economy of manufacture.

BRIEF SUMMARY OF THE DISCLOSURE

A motor vehicle in accordance with this invention has a pair of front steerable wheels which are drivingly connected to the vehicle engine. Independent suspension means is provided for connecting each wheel to the vehicle's chassis frame.

The left wheel of the suspension is rotatably supported on a wheel support member which, in turn, is pivotally connected to a transverse suspension arm. The pivotal connection between the wheel support member and the suspension arm provides a generally vertical axis about which the wheel pivots for steering purposes. A longitudinally oriented radius arm has its forward end rigidly connected to the transverse arm and its rearward end pivotally connected to the vehicle frame.

The right wheel is supported on a wheel support member that is pivotally connected to the right end of a tubular axle housing. The axle housing is rigidly connected to a differential housing. A short arm is rigidly affixed to the differential housing and extends in a leftward direction to a pivotal connection on the frame. A right radius arm has its forward end rigidly connected to the axle housing and its rearward end pivotally connected to the frame. The short arm, the differential housing, the tubular axle housing and the right radius arm combined to form a suspension structure for positioning the right wheel with respect to the vehicle frame.

The differential gearing within the differential housing receives driving torque from the vehicle's engine and distributes it through left and right axle shafts. The right axle shaft is rotatably supported within the tubular axle housing and is drivingly connected to the right wheel. The left axle shaft is drivingly connected to the left front wheel and includes a universal joint and a slip spline coupling.

Because the left and right wheels are steerable wheels, the axle shafts are drivingly connected to the wheels by means of universal joints situated on the steering axes of the wheels.

In operation, the left wheel is angularly displaced along a jounce and rebound path about a pivot axis that passes through the pivot connecting the left transverse arm to the frame. That pivot is situated well to the right of the center line of the vehicle. In a similar manner, the right wheel traverses a jounce and rebound path about a pivot axis that passes through the pivotal connection between the short arm affixed to the differential housing and the frame. That pivotal connection is situated well to the left of the vehicle's center line.

Thus, the suspension members which support the left and right wheels are arranged in overlapping manner and are of much greater length than the conventional swingaxle independent suspension. Therefore, a suspension in accordance with this invention has greater stability and reduced camber change during jounce and rebound movement as compared with a swing-axle independent suspension.

BRIEF DESCRIPTION OF THE DRAWINGS

The many objects and advantages of an independent suspension system that is constructed in accordance with this invention will become apparent upon consideration of the following detailed discussion and the accompanying drawings, in which:

FIG. 4 is a side elevational view of the left radius arm.

DETAILED DESCRIPTION OF THE PREFERRED EMBODIMENT

Figure 1:
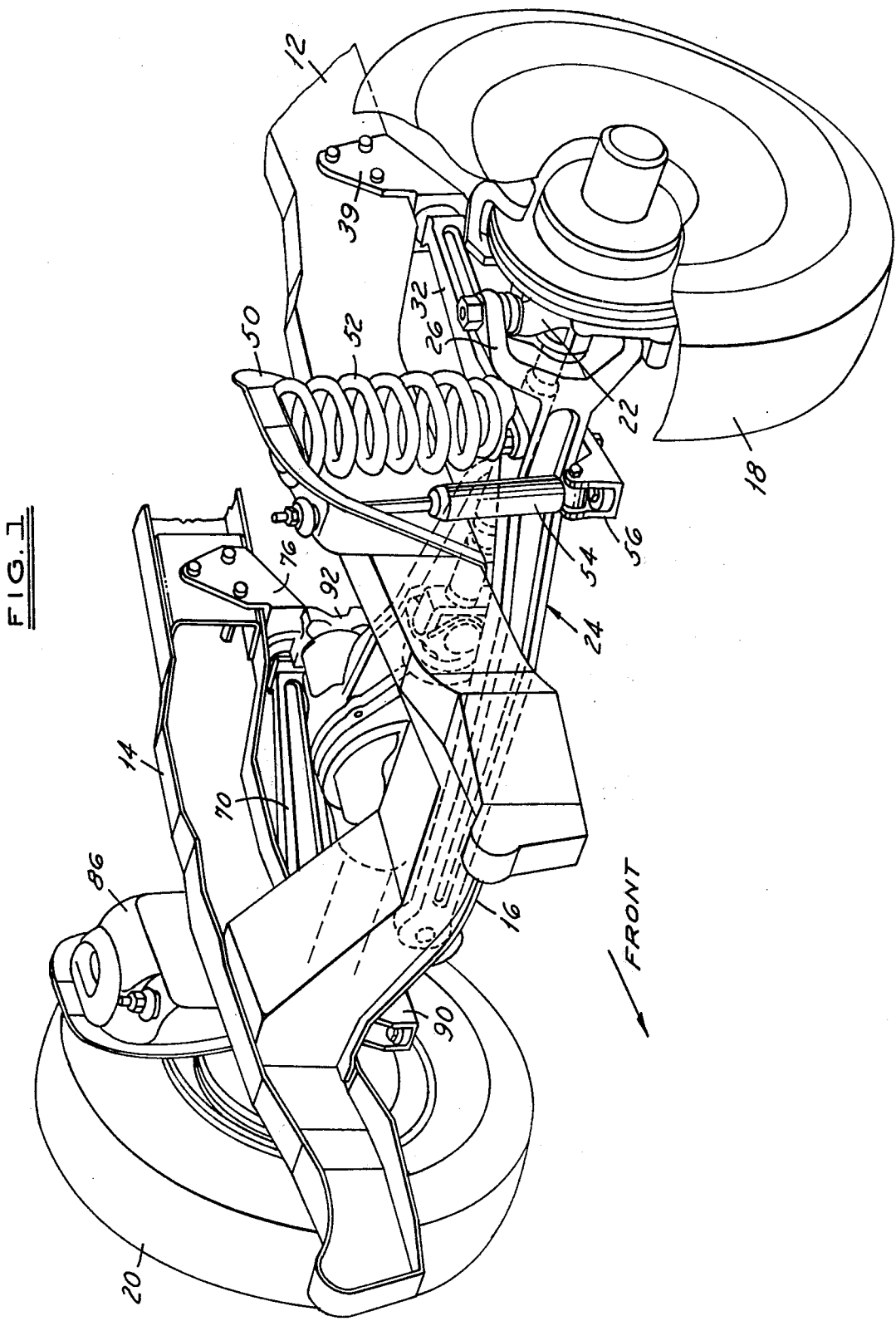
FIG. 1 is a perspective view of an independent front suspension embodying this invention.

The presently preferred embodiment of this invention is illustrated in the drawings. FIG. 1 shows a portion of a motor vehicle that includes a chassis frame, a pair of steerable front wheels, an independent suspension system interconnecting the wheels and the frame and a driving means for the wheels. The vehicle chassis comprises a vehicle frame 10 that includes left and right longitudinally extending frame side rails 12 and 14. A frame cross member 16 interconnects the side rails 12 and 14. Left and right dirigible road wheels 18 and 20 are positioned adjacent and outboard of the side rails 12 and 14. The left wheel 18 is rotatably supported by a wheel support member or steering knuckle 22 by means of roller bearings in a conventional fashion.

Figure 3:
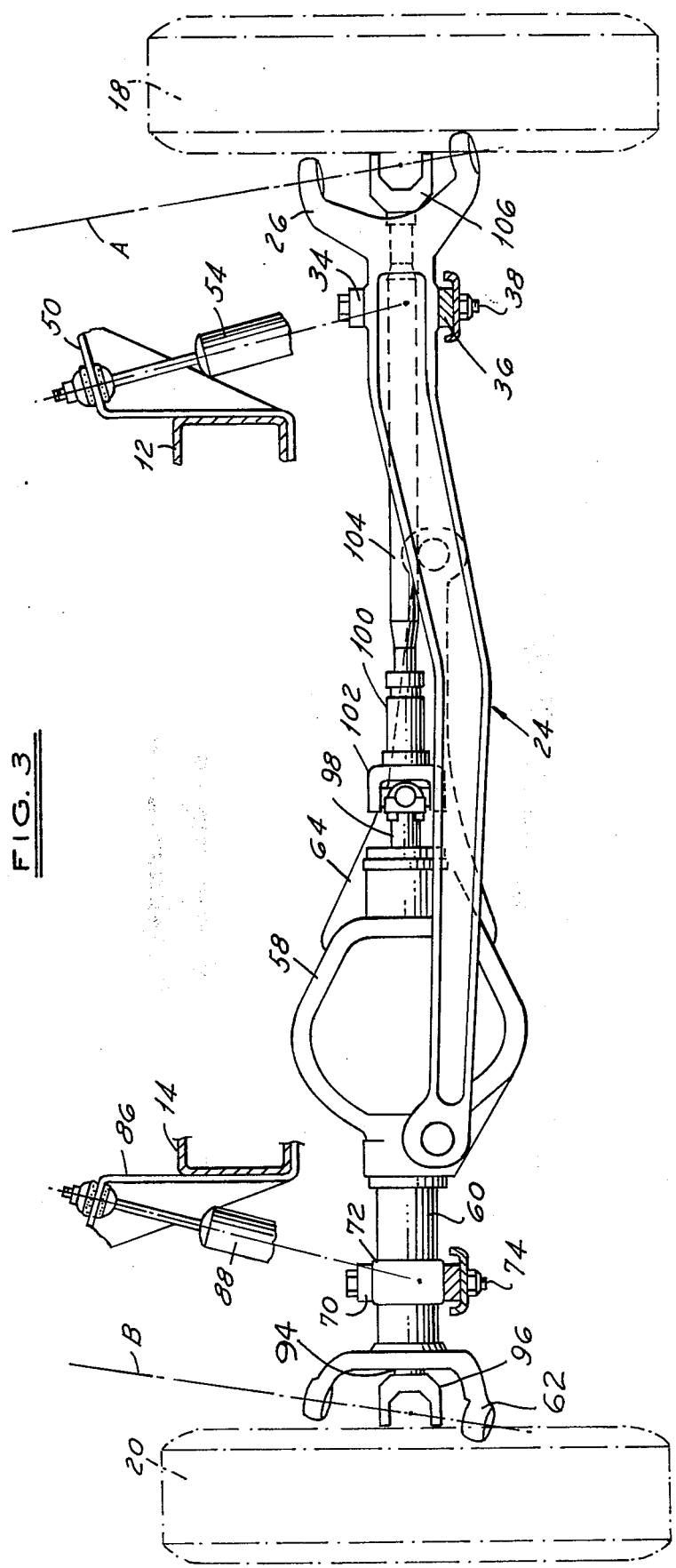
FIG. 3 is a front elevational view of the suspension of FIG. 2.

Independent suspension means is provided to connect the wheel support member 22 to the frame 10. A transverse suspension arm 24 has a bifurcated outer end 26 that is connected to the knuckle 22 by pivot means having a pivot axis "A" (FIG. 3). Axis A is the steering axis for the left wheel 18. The inner end of the transverse arm 24 is formed with an eye and is pivotally connected to the frame 10 by means of a resilient bushing 28. A bracket 30 depends from the frame cross member 16 to support the bushing 28.

A longitudinally arranged radius arm 32 has a pair of forwardly extending portions 34 and 36 that form a bifurcated structure which straddles the suspension arm 24. A bolt 38 rigidly secures the radius arm 32 to the transverse suspension arm 24.

The rearward end of the radius arm 32 is pivotally secured to a bracket 39 that depends from the side rail 12 by means of a bayonet type connection. The connection includes a pair of annular rubber elements 40 and 42 surrounding the rod like end 44 of the radius arm 32 and engaging opposite sides of the frame bracket 40. A nut 46 threadedly engages the end of the shaft portion 44 and compresses the rubber elements 40 and 42 against the bracket 39. The resiliency of the rubber pieces 40 and 42 permits pivotal movement between the radius arm 32 and the frame 10.

A spring seat 48 is bolted to the forward upper surface of the radius arm 32. A spring bracket 50 (FIG. 1) is welded to the frame rail 12 and is spaced above the spring seat 48. A coil type suspension spring 52 is interposed between the spring bracket 50 and the spring seat 48. The spring 52 resiliently supports a share of the vehicle weight on the left wheel 18.

A direct acting hydraulic shock absorber 54 is constructed to be operatively interposed between the radius arm 32 and the spring bracket 50. A bracket 56 extends forwardly from portion 36 of the radius arm 32 and has a bifurcated part that is connected to the lower end of the shock absorber 54 by a pivot bolt. The upper end of the piston rod which extends from the shock absorber 52 is connected to the spring bracket 50 by means of a resilient bayonet type mount that is not unlike the construction shown at the left end of the radius arm 32 of FIG. 4.

Independent suspension means is provided for connecting the right dirigible wheel 20 to the frame 10. A differential housing 58 has a tubular axle housing 60 rigidly secured thereto. A bifurcated member 62 is welded to the outer end of the axle housing 60. A wheel support member or steering knuckle (not shown) for the right wheel 20 is pivotally connected to the member 62 by means which provides a steering axis "B". A short transverse arm 64 has its right end rigidly affixed to the differential housing 58. The left end of the arm 64 is provided with an eye and is pivotally connected to a frame bracket 66 by means of a resilient bushing 68. The bracket 66 is secured to the frame side rail 12.

A right longitudinally extending radius arm 70 has a bifurcated forward construction similar to that of the left radius arm 32 shown in FIG. 4. A box shape bracket 72 is welded to the tubular axle housing 60 and the bifurcated forward end of the radius arm 70 straddles the housing 60 and is secured to the box shape bracket 72 by means of a vertically arranged bolt 74.

The rearward end of the radius arm 70 is pivotally connected to the frame 10 by a resilient bayonet type mount. A bracket 76 depends from the frame rail 14. A pair of annular resilient elements 78 and 80 surround the shaft like end 82 of the radius arm 70 and are drawn into tight engagement with the bracket 76 by a nut 84.

A right spring bracket 86 is secured to the right side rail 14 and a coil type suspension spring is interposed between the bracket 86 and a spring seat (not shown) situated at the forward end of the radius arm 70. A direct acting hydraulic shock absorber 88 is interposed between the spring bracket 90 that extends forwardly from the forward end of the right radius arm 70.

Means are provided for driving the dirigible road wheels 18 and 20. Differential gearing is situated within the differential housing 58. A pinion shaft 92 extends rearwardly from the housing 58 and is connected to the engine of the vehicle. A right axle shaft 94 is rotatably supported within the axle tube 60 and is operatively connected to the gearing within the housing 58. A yoke 96 on the outer ends of the shaft 94 connects to a universal joint that is, in turn, drivingly connected to the wheel 20. The center of the universal joint of which the yoke 96 is a part lies on the steering axis B.

A short axle shaft 98 extends from the left side of the differential housing 58. The shaft 98 is connected to a slip spline coupling 100 by means of a universal joint 102. The coupling 100 is connected to a left axle shaft 104 that terminates at its left outer end in a yoke 106. The shaft 104 extends through an opening in the radius arm 32 that is defined, in part, by the extending portions 34 and 36 of the arm (see FIG. 4). The yoke 106 forms part of a universal joint which drivingly connect the shaft 104 to the left wheel 18. The center of the universal joint which is formed, in part, by the yoke 106 lies on the steering axis A.

OPERATION

Figure 2:
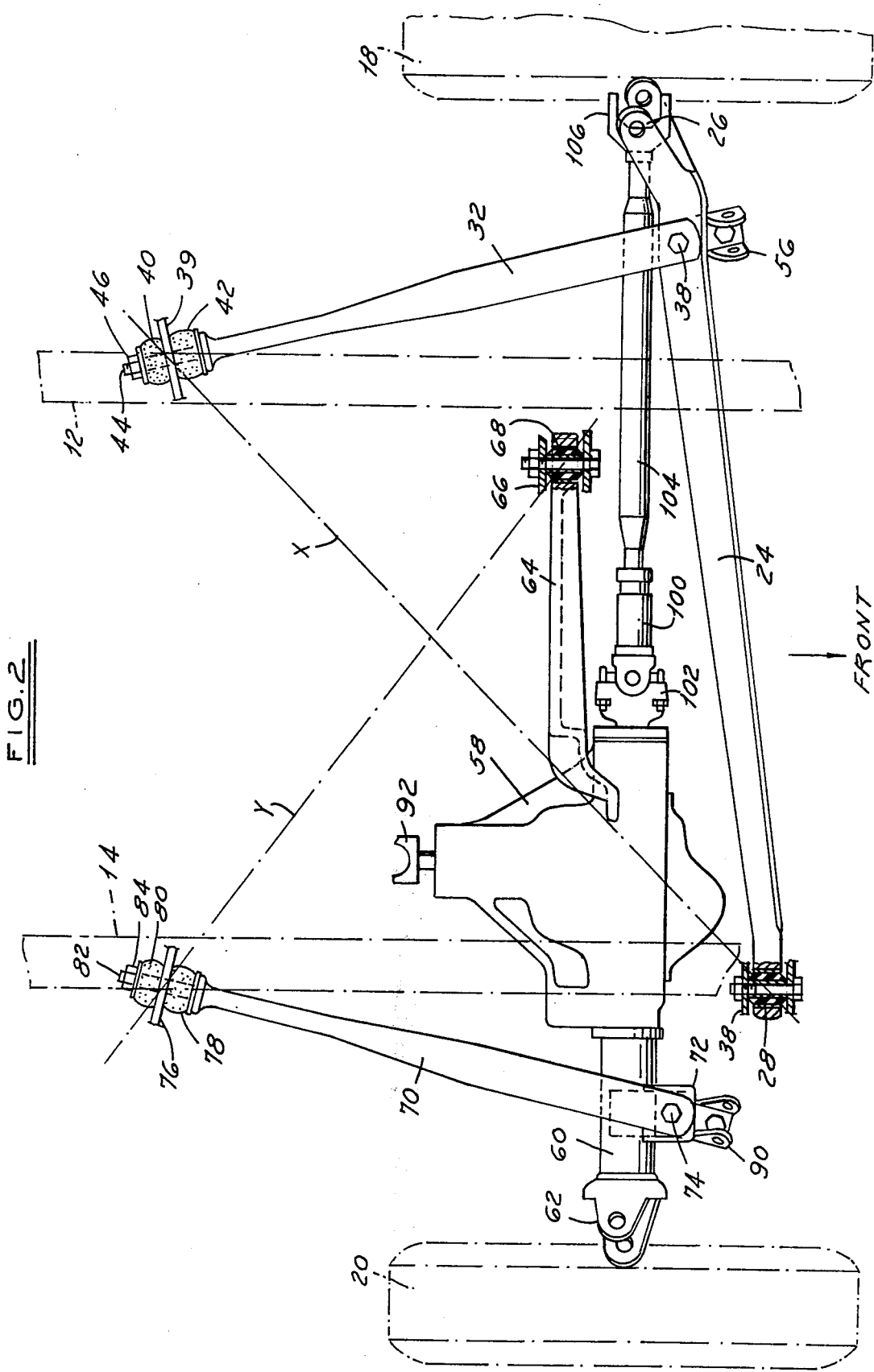
FIG. 2 is a top plan view of the suspension of FIG. 1.

In the preferred embodiment of the present invention, the left wheel 18 is positioned with respect to the frame 10 and traverses a jounce and rebound path as determined by the geometry of the transverse arm 24 and the radius arm 32. These arms pivot as a unit about an axis X (FIG. 2) that extends through the center of the resilient bushing 28 and the center of the resilient elements 40 and 42 which connect the radius arm 32 to the frame.

The right wheel 20 traverses a jounce and rebound path with respect to the frame 10 in accordance with the geometry dictated by the radius arm 70 and the transverse "arm" formed by the axle tube 60, the differential housing 58 and the short arm 64. The wheel 20 pivots about the axis Y which extends through the center of the resilient bushing 68 for the arm 64 and the center of the resilient members 78 and 80.

Driving torque is transmitted to the wheels 18 and 20 from the differential pinion shaft 92 by means of gearing (not shown) situated within the differential housing 58. The gearing receives torque from the vehicle engine and drives the right axle shaft 94 and the left axle shaft 104. Because the differential housing 58 is an unsprung member and moves when the wheel 20 moves up and down, the universal joint 102 and the slip spline coupling 100 are provided to compensate for the differences in geometry between the left and right wheel suspensions.

The present invention combines the advantages of a solid axle suspension with an independent suspension. It has the improved stability and handling performance associated with an independent suspension while having much of the simplicity of a solid axle suspension. Because the pivot bushings 28 and 68 are spaced well to the right and left, respectively, of the center line of the vehicle, low camber change occurs during jounce and rebound wheel movement. In summary, the suspension is characterized by its simplicity of construction and economy of manufacture.

The foregoing description presents the presently preferred embodiment of this invention. Modifications and alterations may occur to those skilled in the art that will come within the scope and spirit of the following claims.

We claim:

1. An independent wheel suspension system for a motor vehicle comprising:
    first and second dirigible road wheels,
    a chassis frame,
    suspension means interconnecting said wheels and said frame,
    said suspension means including first and second members rotatably supporting said first and second wheels, respectively,
    a first transverse suspension arm,
    first pivot means pivotally connecting one end of said first transverse arm to said frame,
    a second pivot means connecting the other end of said first transverse arm to said first member and providing a generally vertically arranged steering axis,
    a longitudinally extending first radius arm having one end connected to said first transverse arm, third pivot means connecting the other end of said first radius arm to said chassis frame, said first and third pivot means lying on a diagonally arranged pivot axis about which said first wheel is angularly displaced during jounce and rebound movement, a rigid housing constructed to support a differential gear assembly, fourth pivot means pivotally connecting said housing to said frame, fifth pivot means connecting said housing to said second member and providing a generally vertically arranged steering axis, a longitudinally extending second radius arm having one end connected to said housing, sixth pivot means connecting the other end of said second radius arm to said frame, said fourth and sixth pivot means lying on a diagonally arranged pivot axis about which said second wheel is angularly displaced during jounce and rebound movement, an extensible first axle shaft means drivingly connected to said first wheel and constructed to be connected to said differential gear assembly, a fixed length second axle shaft means rotatably supported by said housing and drivingly connected to said second wheel and constructed to be connected to said differential gear assembly, means constructed to connect said differential gear assembly to a vehicle engine.

2. An independent wheel suspension system according to claim 1 and including:

one of said first and fourth pivot means being located forwardly of the center line of said first axle shaft means and the other of said first and fourth pivot means being located rearwardly of the center line of said first axle shaft means when said suspension system is observed in the plan view.

3. An independent wheel suspension system according to claim 1 and including:

said rigid housing and said first transverse arm being arranged in overlapping relationship when said suspension system is observed in front elevational view.

4. An independent wheel suspension system according to claim 1 and including:

said rigid housing and said first transverse arm being arranged in overlapping relationship when said suspension system is observed in front elevational view, one of said first and fourth pivot means being located forwardly of the center line of said first axle shaft means the other of said first and fourth pivot means being located rearwardly of the center line of said first axle shaft means when said suspension system is observed in the plan view.

5. An independent wheel suspension system according to claim 1 and including:

said rigid housing and said transverse arm being arranged in overlapping relationship when said suspension system is observed in front elevational view, one of said first and fourth pivot means being located forwardly of the center line of said first axle shaft means and the other of said first and fourth pivot means being located rearwardly of the center line of said first axle shaft means when said suspension system is observed in the plan view, a coil spring interposed between each of the one ends of said first and second radius arms and said frame, said first pivot means being located closer to said second wheel than said first wheel, said fourth pivot means being located closer to said first wheel than said second wheel, said rigid housing including a tubular housing portion rotatably supporting said second axle shaft means.

6. An independent front wheel suspension system for a front wheel drive motor vehicle comprising:

first and second dirigible road wheels, a chassis frame, suspension means interconnecting said wheels and said frame, said suspension means including first and second members rotatably supporting said first and second wheels, respectively, a transverse suspension arm and a first pivot means pivotally connecting one end of said transverse arm to said frame, a second pivot means connecting the other end of said transverse arm to said first member and providing a generally vertically arranged steering axis, a longitudinally extending rigid first radius arm having one end connected to said transverse arm, third pivot means connecting the other end of said first radius arm to said chassis frame, said first and third pivot means lying on a diagonally arranged pivot axis about which said first wheel is angularly displaced during jounce and rebound movement, a rigid housing constructed to support a differential gear assembly, fourth pivot means pivotally connecting said housing to said frame, fifth pivot means connecting said housing to said second member and providing a generally vertically arranged steering axis, a longitudinally extending rigid second radius arm having one end connected to said housing, sixth pivot means connecting the other end of said second radius arm to said frame, said fourth and sixth pivot means lying on a diagonally arranged pivot axis about which said second wheel is angularly displaced during jounce and rebound movement, an extensible first axle shaft means drivingly connected to said first wheel and constructed to be connected to said differential gear assembly, a fixed length second axle shaft means rotatably supported by said housing and drivingly connected to said second wheel and constructed to be connected to said differential gear assembly, means constructed to connect said differential gear assembly to a vehicle engine, said rigid housing and said transverse arm being arranged in overlapping relationship when said suspension system is observed in front elevational view, one of said first and fourth pivot means being located forwardly of the center line of said first axle shaft means and the other of said first and fourth pivot means being located rearwardly of center line of said first axle shaft means when said suspension system is observed in the plan view.

a coil spring interposed between each of the one ends of said first and second radius arms and said frame, said first pivot means being located closer to said second wheel than said first wheel,
said fourth pivot means being located closer to said first wheel than said second wheel,
said rigid housing including a tubular housing portion rotatably supporting said second axle shaft means,
said one end of said first radius arm having a bifurcated structure cooperating with said transverse arm to define an opening,
said first axle shaft means extending through said opening of said one end of said first radius arm.

* * * * *